United States Patent
Matthey et al.

(10) Patent No.: US 10,137,812 B2
(45) Date of Patent: Nov. 27, 2018

(54) BACKREST FRAME FOR A VEHICLE SEAT

(75) Inventors: Cristina Matthey, Monheim (DE); Thomas Flehmig, Ratingen (DE); Andreas Ulrichs, Moers (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 13/289,660

(22) Filed: Nov. 4, 2011

(65) Prior Publication Data
US 2012/0074755 A1 Mar. 29, 2012

Related U.S. Application Data

(63) Continuation of application No. PCT/EP2010/056192, filed on May 6, 2010.

(30) Foreign Application Priority Data

May 8, 2009 (DE) .................. 10 2009 025 780

(51) Int. Cl.
*B60N 2/68* (2006.01)

(52) U.S. Cl.
CPC ............. *B60N 2/682* (2013.01); *B60N 2/688* (2013.01)

(58) Field of Classification Search
USPC .......................................... 297/452.18, 452.2
See application file for complete search history.

(56) References Cited

U.S. PATENT DOCUMENTS

| | | | |
|---|---|---|---|
| 2,136,122 A | | 11/1938 | Almdale |
| 2,720,914 A | | 10/1955 | Doty et al. |
| 3,209,432 A | * | 10/1965 | Cape ........................... 29/897.2 |
| 3,890,696 A | * | 6/1975 | Buske ................... B21D 47/01 228/155 |
| 4,685,739 A | * | 8/1987 | Deegener et al. ....... 297/452.65 |
| 4,804,226 A | * | 2/1989 | Schmale .................. 297/216.13 |
| 5,249,841 A | * | 10/1993 | Chales ..................... 297/452.18 |
| 5,439,272 A | | 8/1995 | Hallet et al. |
| 5,499,863 A | * | 3/1996 | Nakane et al. ............ 297/452.2 |

(Continued)

FOREIGN PATENT DOCUMENTS

| | | |
|---|---|---|
| DE | 296 22 299 U1 | 4/1997 |
| DE | 196 04 942 A1 | 8/1997 |

(Continued)

*Primary Examiner* — Timothy J Brindley
(74) *Attorney, Agent, or Firm* — Reinhart Boerner Van Deuren P.C.

(57) ABSTRACT

The invention relates to a seat-back frame for a vehicle seat, which seat-back frame has a frame region extending transversely and two frame regions extending vertically and is of a U-shaped form. The object to provide a seat-back frame of the generic kind which has a minimum of components and at the same time allows a seat-back frame for belt-integrated vehicle seats to be provided easily is met in that there is provided a first half-shell made of a metal, which first half-shell forms a sub-region of each of the vertically extending frame regions of the seat-back frame and forms a sub-region of the transversely extending frame region of the seat-back frame, and there is provided a second sheet-metal half-shell which is connected to the first half-shell by bonding and which reinforces at least the transversely extending frame region of the seat-back frame.

5 Claims, 3 Drawing Sheets

(56) References Cited

U.S. PATENT DOCUMENTS

| | | | |
|---|---|---|---|
| 5,501,509 A * | 3/1996 | Urrutia | 297/452.18 |
| 5,626,396 A | 5/1997 | Kuragano et al. | |
| 5,671,976 A * | 9/1997 | Fredrick | 297/452.18 |
| 5,685,614 A * | 11/1997 | Chabanne | 297/452.2 |
| 5,749,135 A * | 5/1998 | Crane et al. | 297/452.2 |
| 5,826,944 A * | 10/1998 | Beneker et al. | 297/440.2 |
| 6,241,318 B1 * | 6/2001 | Amano | B60N 2/682 297/452.2 |
| 6,588,084 B2 * | 7/2003 | Dudziak | B21D 26/033 29/421.1 |
| 6,869,145 B2 * | 3/2005 | Matsunuma | 297/452.18 |
| 7,066,552 B2 * | 6/2006 | Yoshida | 297/452.18 |
| 7,093,901 B2 * | 8/2006 | Yamada | 297/367 R |
| 7,134,456 B2 * | 11/2006 | Maeda et al. | 138/156 |
| 7,887,139 B2 * | 2/2011 | Yamada | B60N 2/22 297/452.18 |
| 8,091,237 B2 * | 1/2012 | Binelli | 297/452.2 |
| 2005/0225133 A1 * | 10/2005 | Aufrere et al. | 297/216.1 |
| 2008/0277993 A1 * | 11/2008 | Blankart | 297/452.18 |

FOREIGN PATENT DOCUMENTS

| | | |
|---|---|---|
| DE | 100 47 770 A1 | 4/2002 |
| DE | 101 42 981 A1 | 3/2003 |
| DE | 10 2004 048 350 A1 | 4/2006 |
| DE | 10 2004 048 351 A1 | 4/2006 |
| DE | 20 2005 001 773 U1 | 6/2006 |
| DE | 10 2005 044 221 A1 | 3/2007 |
| DE | 10 2006 036 915 A1 | 2/2008 |
| EP | 0 590 237 A1 | 4/1994 |
| EP | 1 186 516 A1 | 3/2002 |
| GB | 2 297 687 A | 8/1996 |
| JP | H0670827 A | 3/1994 |
| JP | H06205716 A | 7/1994 |
| JP | H08112160 A | 5/1996 |
| JP | 2004148326 A | 5/2004 |
| JP | 2006051272 A | 2/2006 |
| WO | WO 2004/086909 A1 | 10/2004 |
| WO | WO 2008/131228 A2 | 10/2008 |
| WO | WO 2009066533 A1 | 5/2009 |

* cited by examiner

BACKREST FRAME FOR A VEHICLE SEAT

CROSS-REFERENCE TO RELATED PATENT APPLICATIONS

This patent application is a continuation of PCT/EP2010/056192, filed May 6, 2010, which claims priority to German Application No. 102009025780.2, filed May 8, 2009, the entire teachings and disclosure of which are incorporated herein by reference thereto.

FIELD OF THE INVENTION

The invention relates to a seat-back frame for a vehicle seat, which seat-back frame has a frame region extending transversely and two frame regions extending vertically and is of a U-shaped form.

BACKGROUND OF THE INVENTION

Seats for motor vehicles usually have a bottom frame on which the seat-back is mounted. The seat-back consists of a seat-back frame which is upholstered and covered with fabrics and/or leather. The design of seat-back frames differs depending on whether or not a belt is integrated into the vehicle seat. This is because, in belt-integrated vehicle seats, the seat-back frame needs to be particularly strong to enable the forces occurring in the event of an accident to be absorbed and passed on to the points to which the vehicle seat is fastened. As well as the application-related requirements, what also generally arises in automobile construction is a demand for the seat-back frame to be as low in weight as possible and, moreover, for the seat-back frame to be manufactured as inexpensively as possible. There are different approaches to this known from the prior art. From German utility model DE 20 2005 001 773 U1 for example a seat-back frame for a vehicle seat is known which is of a box-like form, with the vertical and transversely extending regions of the seat-back frame each being formed by a metal profile. Something that is problematic about this vehicle seat is that the frame structure cannot readily be adapted to belt-integrated vehicle seats and comprises a relatively large number of individual parts. A U-shaped seat-back frame for a vehicle seat is known from German utility model DE 296 22 299 U1. The U-shaped seat-back frame consists of vertical frame regions which are each produced from two half-shells and which are connected by a transversely extending frame region which is likewise consisting of two half-shells. This seat-back frame thus consists of six components. If one of the vertically extending frame regions is made stronger to produce a belt-integrated vehicle seat, then the cost of the tooling for the production of an appropriate quantity of metal profiles is high. The solutions known to date for producing a seat-back frame for a vehicle seat are therefore not optimised for the use of as small a number of parts as possible nor do they allow an easy adaptation to be achieved to a seat-back frame for belt-integrated vehicle seats.

SUMMARY OF THE INVENTION

In view of the aforementioned, the object of the present invention is to provide a seat-back frame of the generic kind which has a minimum of components and at the same time allows a seat-back frame for belt-integrated vehicle seats to be provided easily.

In accordance with a first teaching of the present invention, the stated object is achieved by providing a first half-shell made of a metal, which first half-shell forms a sub-region of each of the vertically extending frame regions of the seat-back frame and forms a sub-region of each of the transversely extending frame region of the seat-back frame, and by providing a second sheet-metal half-shell which is connected to the first half-shell by bonding and which reinforces at least the transversely extending frame region of the seat-back frame.

The result is that all that are used in accordance with the invention to produce the seat-back frame of a vehicle seat are two sheet-metal half-shell. By the use of sheet-metal half-shells, which are preferably deep-drawn, it is possible to provide complex structures which are capable of absorbing and dissipating the forces occurring in the seat-back frame. The connection by bonding between the sheet-metal half-shells can be achieved by welding, soldering or adhesive-bonding. The reinforcement of the transversely extending frame region of the seat-back frame is achieved by means of the second sheet-metal half-shell which is connected in this region to the first sheet-metal half-shell, particularly by a butt joint. To give a further reduction in weight, flangeless half-shells are preferably used.

In a first embodiment of the seat-back frame according to the invention, the second sheet-metal half-shell is of a U-shaped form and provide additional reinforcement for at least part of both of the two vertical extending frame regions of the seat-back frame. The U-shaped form of the second sheet-metal half-shell makes it possible for the sub-regions too of the vertically extending frame regions of the seat-back frame to be able to be reinforced easily.

If, in a further embodiment of the seat-back frame according to the invention, the seat-back frame is intended for a belt-integrated vehicle seat and if, on at least one side, the second sheet-metal half-shell reinforces the whole of one of the vertically extending frame regions, it is easily possible to provide a seat-back frame for belt-integrated vehicle seats which has a reinforced vertically extending frame region to absorb the forces which arise due to the belt integration. In particular it is only precisely one component, namely the second sheet-metal half-shell, which has to be modified to make the seat-back frame suitable for a belt-integrated vehicle seat. This appreciably reduces the tooling costs and hence the costs of producing corresponding seat-back frames.

Another possible way of improving the seat-back frame according to the invention is for at least one of the half-shells to be produced from a tailored blank. This tailored blank consists of at least two different metal sheets which are composed of materials specifically adapted to the loads involved which are of appropriate wall thicknesses. The use of such tailored blanks to produce the half-shells for the seat-back frame makes a further reduction in weight possible.

As an alternative to the first teaching of the present invention, the object stated above for a seat-back frame for a vehicle seat is achieved by provided a deep-drawn sheet-metal part which forms the transversely extending frame region and a first and a second profile which form respective ones of the vertically extending frame regions, the deep-drawn sheet-metal part having flanges for connecting on the profiles by bonding and at least one of the vertically extending profiles being a hollow profile which is produced by using the T3 technology.

What is meant by the T3 technology is a forming process developed by the present applicant in which a blank is produced to give flangeless half-shells exhibiting low spring-back and a hollow profile is then produced from two flangeless half-shells, or a flangeless hollow profile is produced from a blank by U-to-O forming using a forming core. What is common to both the methods covered by the term T3 technology is that a flangeless structured hollow profile is produced easily and economically, thus enabling expensive hydroforming to be avoided. Depending on the strength desired for the structuring of the hollow profiles being produced, use may also be made of W-to-O forming, the blank first being formed into a W-shape and then being formed into a closed hollow profile and welded. The T3 forming is preferably performed in a single apparatus. This variant of the seat-back frame likewise manages with a small number of components, in which case, due to the use of hollow profiles produced by the T3 technology, it is possible for only a minimal number of welds to be present in the whole of the seat-back frame, thus enabling maximum strength to be provided for the seat-back frame with, at the same time, a minimum number of parts. Because of the use of the hollow profiles produced by the T3 technology, it is possible to provide hollow profiles which have complex changes in cross-section, the said hollow profiles thus being specifically matched to the relevant loads but nevertheless having only one weld where there is one cut blank or two welds where the hollow profiles are produced from two half-shells. The T3 technology thus enables an optimum match to be made to relevant design specifications or to trends. At the same time, the hollow profiles produced by using the T3 technology are flangeless, which means that the consumption of material and the weight of the hollow profiles are correspondingly small. The flanges of the deep-drawn sheet-metal part are used to connect the sheet-metal part to the profiles which are provided in the given case. They allow the hollow profiles to be connected to the transversely extending deep-drawn sheet-metal part by bonding in a particularly strong and easy way.

In one embodiment of the seat-back frame, the seat-back frame is intended for a belt-integrated vehicle seat. This seat-back frame may for example be adapted easily by giving a hollow profile a higher stiffness, thus enabling the increased forces occurring in the belt-integrated vehicle seat to be absorbed by the seat-back frame.

As has already been explained above, a good adaptation can be made to the use of at least one hollow profile in the seat-back frame by giving the hollow profile varying cross-sections in the axial direction. Due to the use of the T3 technology relatively few limits are set to the complexity with which the hollow profiles can be shaped, thus enabling the cross-sections to be matched in the optimum way to the application-related loads, the outcome of which is, as a result, the use of a particularly small amount of material for stiffness which is as high as possible and weight which is as low as possible.

Finally, an improvement in the seat-back frame with regard to the loads in the vehicle seat can be achieved by producing the deep-drawn sheet-metal part and/or at least one of the profiles from a tailored blank. The tailored blank allows use to be made of different grades of material and thicknesses of material in one sheet-metal part and hence in a profile or a deep-drawn part. While only a minimal amount of material is used, further improvements can thus be obtained with regard to the weight of the seat-back frame and its mechanical load-bearing capacity.

BRIEF DESCRIPTION OF THE DRAWINGS

There are then a large number of possible ways in which the seat-back frame according to the invention for a vehicle seat can be embodied and refined. For these, attention is directed on the one hand to the claims which follow claims 1 and 5 and to the description of exemplary embodiments given in connection with the drawings. In the drawings

DETAILED DESCRIPTION OF THE INVENTION

Figure 1:
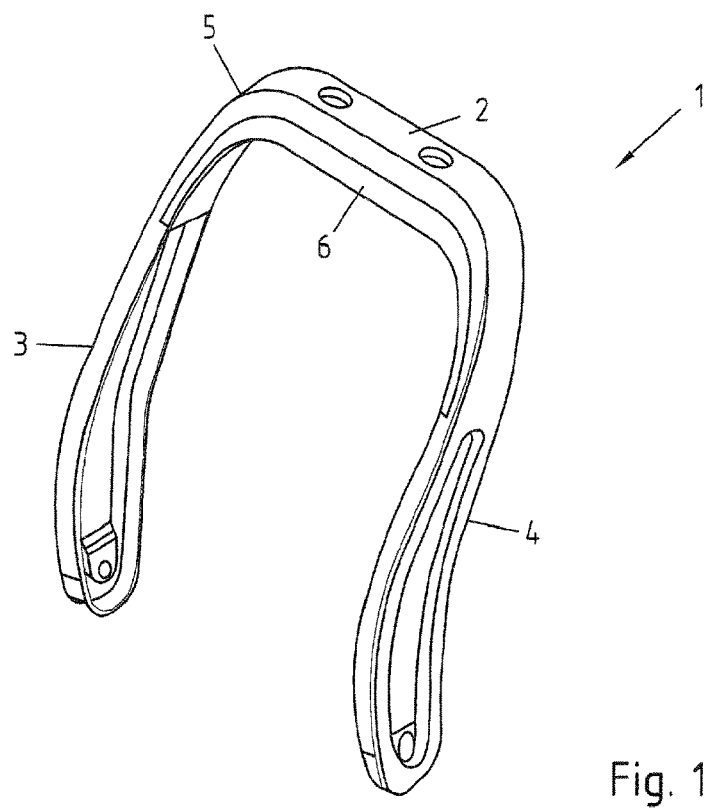
FIG. 1 shows an exemplary embodiment of seat-back frame according to the invention having at least two sheet-metal half-shells, for a standard vehicle seat.

FIG. 1 is first of all a perspective view showing a first exemplary embodiment of seat-back frame 1 according to the invention which is of a U-shaped form. The seat-back frame 1 of U-shaped form consists of a half-shell 5 which has a sub-region 2 which forms the transversely extending frame region and respective sub-regions 3 and 4 which form the vertically extending frame regions. There is then provided in addition a further sheet-metal half-shell 6 which is connected by bonding, for example by welding, to the sheet-metal half-shell 5. The second sheet-metal half-shell 5 thus reinforces the transversely extending frame region of the seat-back frame 2 and partly reinforces the vertically extending frame regions 3 and 4 of the seat-back frame 1.

Figure 2:
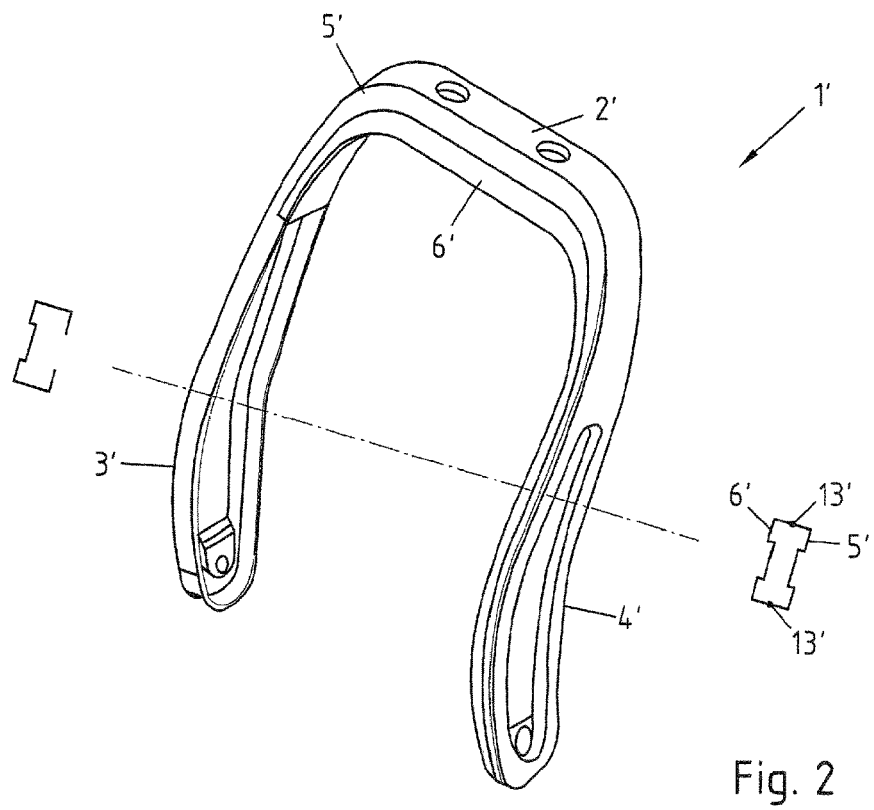
FIG. 2 shows a second exemplary embodiment of seat-back frame according to the invention having at least two sheet-metal half-shells, for a belt-integrated vehicle seat.

In contrast to what is shown in FIG. 1, what is shown in FIG. 2 is a second exemplary embodiment of seat-back frame according to the invention which is intended for a belt-integrated vehicle seat. As well as the half-shell 5' which substantially forms the U-shaped seat-back frame 1', the seat-back frame 1' for belt-integrated vehicle seats has, in addition, a sheet-metal half-shell 6' which extends along the right-hand leg of the U-shaped seat-back frame 1' and, this being the case, reinforces the whole not only of the transversely extending frame region 2' of the seat-back frame but also of the vertical frame region 4' thereof. By the use of three components, this embodiment makes it possible to provide a seat-back frame 1' for belt-integrated vehicle seats which is easy to manufacture and which enables the requisite stiffness to be obtained to absorb the forces when a belt is integrated into the vehicle seat. In the sectional planes shown in FIG. 2 are shown by way of example the cross-sections of the vertically extending frame regions of the seat-back frame. The vertically extending and reinforced frame region 4' of the seat-back frame 1' for belt-integrated vehicle seats has for example a closed cross-sectional area whereas the vertically extending frame region 3' of the frame has an open cross-section area. Also visible in the sectional plane are the welds 13' which connect the half-shells 6' and 5' by bonding to form the reinforced frame region 4' of the frame.

Figure 3:
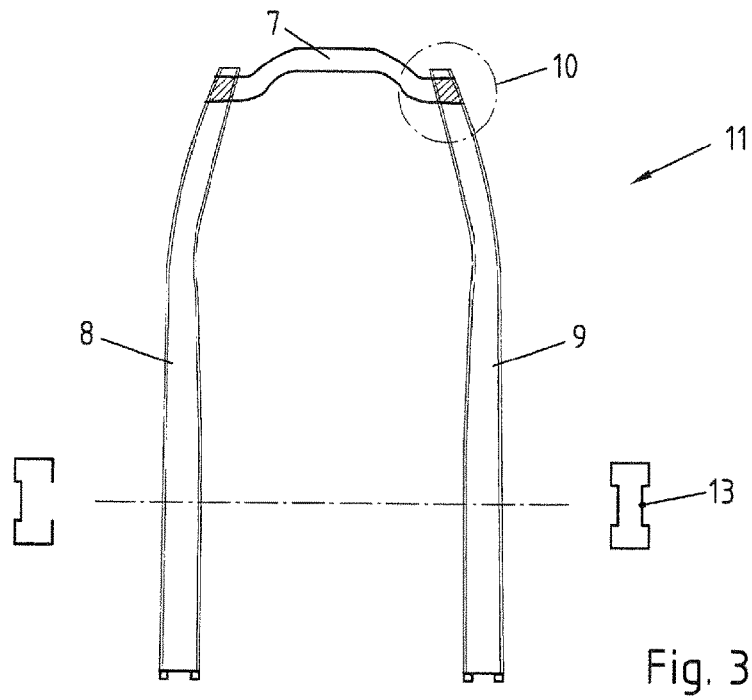
FIG. 3 is a schematic view of a third exemplary embodiment of seat-back frame according to the invention which has profiles and a deep-drawn sheet-metal part.
Figure 4:
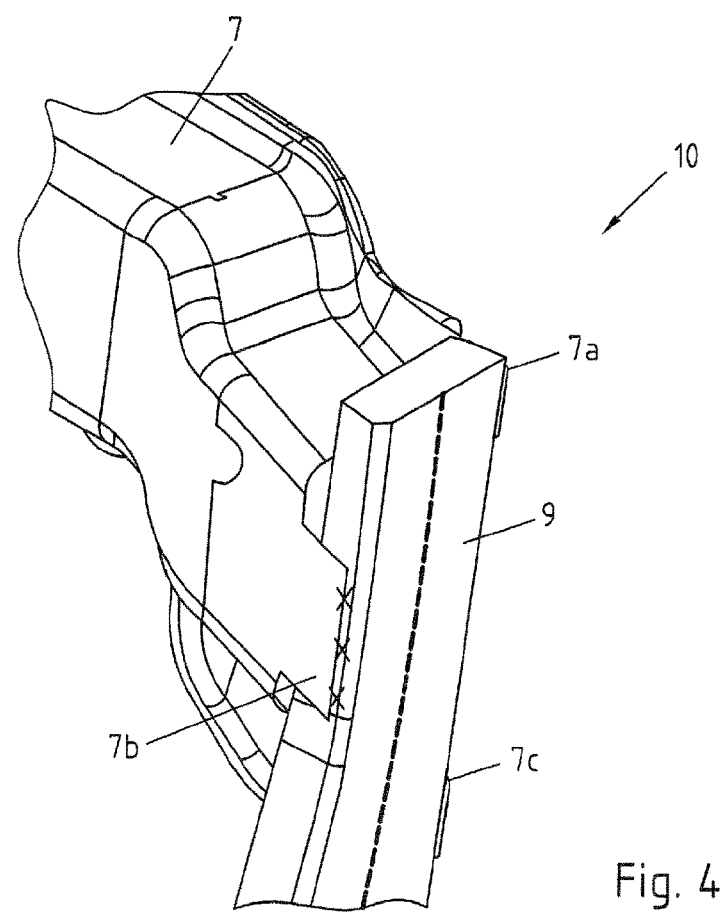
FIG. 4 is a view of a detail of the exemplary embodiment shown in FIG. 3 in the region of the joint between the vertical frame region and the transversely extending frame region.

What is then shown in FIG. 3 is a schematic view of an exemplary embodiment of an alternative seat-back frame 11 according to the invention which consists of a deep-drawn sheet-metal part 7, an open profile 8 and a hollow profile 9. The use of a deep-drawn sheet-metal part 7 and an open profile 8 for a seat-back frame 11 is already known. In contrast to this, the hollow profile 9 is produced by using the T3 technology and has only a single weld 13. Because of the small number of parts, the structure of the seat-back frame 11 is particularly simple but, due to the use of the hollow profile 9 which was produced by the T3 technology, a maximum load-bearing capacity can nevertheless be achieved for the seat-back frame. Not shown in FIG. 3 is the possibility of producing the hollow profile 9 by using the T3 technology, where two welds connect the two flangeless half-shells together by butt joints, thus likewise enabling a hollow profile 9 which is flangeless to be provided. The view of the detail 10 shown in FIG. 4 is a perspective view of the region 10 of the joint between the hollow profile 9 and the deep-drawn sheet-metal part 7. The flanges 7a, 7b, 7c of the sheet-metal part 7 ensure that the deep-drawn sheet-metal part 7 is connected in the optimum way to the hollow profile 9 to give an assurance of maximum stiffness for the seat-back frame 11. As can be seen even from FIG. 4, the side part 9 has a cross-section which varies in the axial direction. These changes in cross-section can easily be provided by the use of the T3 technology.

Figure 5:
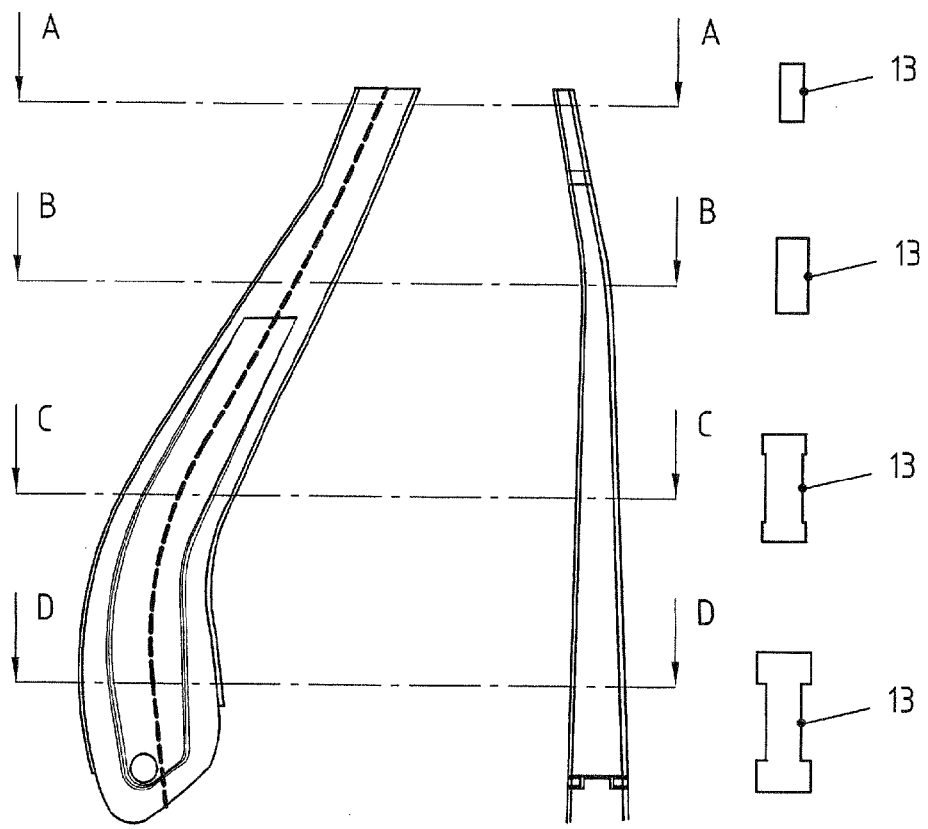
FIG. 5 shows a hollow profile, produced using the T3 technology, for the exemplary embodiment shown in FIG. 3
Figure 6:
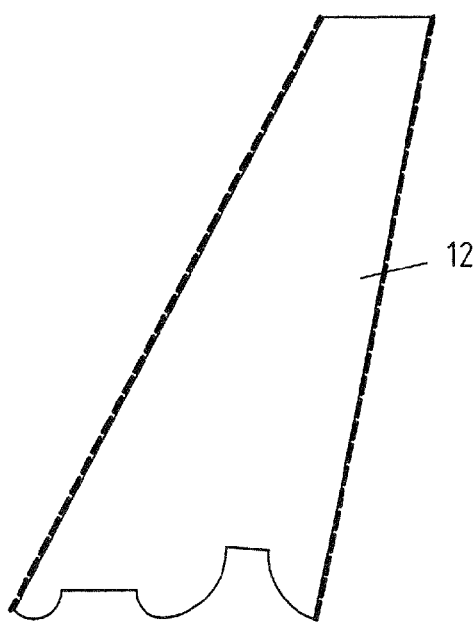
FIG. 6 is a plan view of a cut sheet-metal blank for producing a hollow profile as shown in FIG. 5.

FIG. 5 shows the way in which for example the cross-section of the hollow profile 9 can be configured to match it to the load. At the different sections A, B, C and D, there is a steady increase in the cross-section of the side part, thus enabling the mechanical load-bearing capacity of the hollow profile 9 to be matched to the use made of the seat-back frame in the vehicle seat. When the T3 technology is used, a suitably complex variation in the cross-sectional area of the hollow profile 9 can easily be produced by means of a cut sheet-metal blank 12 such as is shown in FIG. 6. The hollow profile 9 produced by using the T3 technology can then have a single weld 13. If the cut sheet-metal blank 12 also takes the form of a tailored blank, a further optimisation to suit the loading situation can be obtained for the use of the hollow profile in the seat-back frame of a vehicle seat.

The invention claimed is:

1. A Seat-back frame for a vehicle seat, comprising:
a transversely extending frame region;
two vertically extending frame regions extending vertically, such that the seat-back is of a U-shaped form;
wherein a first and a second profile are provided which form respective ones of the vertically extending frame regions and wherein there is provided a deep-drawn sheet-metal part which forms the transversely extending frame region, the deep-drawn sheet-metal part having flanges for connecting on the first and second profiles by bonding and at least one of the first and second profiles is a hollow profile which is formed from a single sheet as a flangeless hollow profile such that at least one part of the first and second profiles formed from the single sheet has a closed hollow profile by joining opposed end regions of the single sheet, wherein the closed hollow profile has varying cross-sections in an axial direction of said closed hollow profile,
wherein the varying cross-sections transition from a hollow, rectangular cross-section proximate to the transversely extending frame region to a hollow, I-shaped cross-section distal from the transversely extending frame region.

2. The seat-back frame according to claim 1, wherein the seat-back frame is intended for a belt-integrated vehicle seat.

3. The seat-back frame according to claim 1, wherein the deep-drawn sheet-metal part and/or at least one of the profiles is produced from a tailored blank.

4. The seat-back frame according to claim 1, wherein the varying cross-sections increase in perimeter going from a first point proximate to the transversely extending frame region to a second point distal from the transversely extending frame region.

5. The seat-back frame according to claim 1, wherein the other of the first and second profiles is an open profile.

* * * * *